(12) United States Patent
Feng (10) Patent No.: US 6,775,077 B1
(45) Date of Patent: Aug. 10, 2004

(54) MICRO READER SCAN ENGINE WITH PRISM

(75) Inventor: Chen Feng, Bothell, WA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/668,105

(22) Filed: Sep. 22, 2000

(51) Int. Cl.[7] .................. G02B 5/04; G02B 26/00; G06K 7/10

(52) U.S. Cl. .............. 359/831; 359/833; 359/513; 250/216; 250/239; 250/566; 235/462.32; 235/462.35; 235/462.41

(58) Field of Search .................. 250/566, 208.1, 250/239, 216, 234, 235; 235/462.14, 462.32, 462.43, 462.35, 462.41; 359/367, 831, 833, 837, 513, 514, 211

(56) References Cited

U.S. PATENT DOCUMENTS

| | | | | |
|---|---|---|---|---|
| 888,236 A | * | 5/1908 | Hattu | |
| 1,932,470 A | * | 10/1933 | Lehmann | ............... 359/367 |
| 2,400,401 A | * | 5/1946 | Eckerman et al. | |
| 3,341,711 A | * | 9/1967 | Shepard | |
| 3,594,578 A | * | 7/1971 | Ohman | |
| 3,850,510 A | * | 11/1974 | Baker | |
| 4,021,119 A | * | 5/1977 | Stauffer | |
| 4,293,225 A | * | 10/1981 | Wheaton et al. | |
| 4,571,028 A | * | 2/1986 | Ziegler et al. | |
| 4,704,519 A | * | 11/1987 | Kulikauskas | |
| 4,730,295 A | * | 3/1988 | Bressers | |
| 5,519,797 A | * | 5/1996 | Chambaret et al. | |
| 5,719,389 A | * | 2/1998 | Taniguchi | |
| 5,793,037 A | * | 8/1998 | Guillot et al. | |
| 5,825,560 A | * | 10/1998 | Ogura et al. | |
| 5,852,287 A | * | 12/1998 | Taniguchi et al. | |
| 5,900,612 A | * | 5/1999 | Tanaka | |
| 5,966,230 A | | 10/1999 | Swartz et al. | |

* cited by examiner

Primary Examiner—Ricky D. Shafer
(74) Attorney, Agent, or Firm—Amin & Turocy, LLP (57) ABSTRACT

A scan engine is disclosed for use in a data collection device, as well as a method for producing a scan engine and an image sensor assembly. The scan engine includes a housing with an opening for receiving light from a scanned dataform, an image sensor which is located within the housing to sense light entering an aperture in the image sensor, and a prism located within the housing for receiving light from the opening along a first path and to provide at least a portion of the received light to the aperture along a second path.

23 Claims, 7 Drawing Sheets

MICRO READER SCAN ENGINE WITH PRISM

TECHNICAL FIELD

The present invention relates generally to data collection devices adapted for reading bar codes and other dataforms, and more particularly to a micro reader scan engine with a prism.

BACKGROUND OF THE INVENTION

Portable data collection devices are widely used in the manufacturing, service and to package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes.

Bar code dataforms come in a variety of different formats including one and two dimensional bar codes, matrix codes and graphic codes, as well as words and numbers and other symbols, which may be printed or etched on paper, plastic cards and metallic and other items. For example, a one dimensional bar code dataform typically consists of a series of parallel light and dark rectangular areas of varying widths. The light areas are often referred to as "spaces" and the dark areas as "bars". Different widths of bars and spaces define different characters in a particular bar code dataform.

Data originally encoded in a dataform is recovered for further use in a variety of ways. For example, a printed bar code may be illuminated to derive reflectance values which are digitized, stored in buffer memory and subsequently decoded to recover the data encoded in the bar code. The printed bar code may be illuminated using a laser, an array of LEDs, ambient light, or the like. The light reflected from the printed bar code typically is captured using a photosensor such as, for example, a CCD detector, CMOS detect, etc, which may take the form of a sensor array integrated circuit including a plurality of such devices.

As data collection devices are used in more specialized applications, it is desirable to scan bar codes and other dataforms from different angles. Conventional scan engines include an image sensor component with an aperture adapted to receive incoming light from a scanned dataform. The light typically passes through an opening in the housing of the scan engine, and the housing may further include a protective cover for the opening. The trend in such devices is toward smaller and smaller packages, as a result of which it is desirable to reduce the size of the scan engine housing opening through which incoming light from a dataform enters. However, the image sensor components used in the data collection device scan engine may be too large to directly receive incoming light from a scanned dataform through a reduced size housing opening. Although the size of the aperture on such an image sensor may be reduced, the footprint of the integrated circuit on which the sensor aperture resides remains relatively large. Custom image sensor integrated circuits may be developed, however, it is desirable to use existing image sensor components to keep the data collection device scan engine cost low. Thus, there remains a need for a data collection device scan engine which may successfully scan dataforms from an angle using existing image sensor components through a reduced size housing opening, and which may scan bar code dataforms at an angle.

SUMMARY OF THE INVENTION

The present invention includes a scan engine for use in a data collection device, which minimizes or overcomes the above mentioned problems and shortcomings encountered in conventional scan engines. The invention further provides a method for producing a scan engine and a scan engine image sensor assembly which further address these shortcomings.

In accordance with an aspect of the present invention, there is provided a scan engine which includes a housing or enclosure with an opening for receiving light from a scanned dataform, an image sensor with an aperture, the image sensor being located within the housing and operative to sense light entering the aperture, and a prism located within the housing and adapted to receive light from the opening along a first path and to provide at least a portion of the received light to the aperture along a second path. In order to utilize existing image sensor integrated circuits, the prism allows the image sensor aperture to be mounted in the housing at an angle to the housing opening, which may be 90 degrees, whereby the second path is perpendicular to the first path. The invention thus allows the use of existing image sensor integrated circuits which may have a component width which is wider than the desired housing opening, in order to provide a reduced size scan engine in which existing image sensor components may be employed.

The prism may include a first planar face generally perpendicular to the first path and a second planar face generally perpendicular to the second path. In addition, the second face may be mounted on the aperture. The first face of the prism may be mounted proximate the opening located in a first wall of the housing. In this fashion, the prism may further operate as a protective cover for the housing opening, for example, wherein the first face of the prism is further adapted to cover the opening. In addition, the front surface of the prism may have a spherical convex shape, so as to serve as an imaging lens, and to thereby further reduce the scan engine cost and size. Moreover, the prism may be adapted to provide a seal around the opening of the first housing wall. Thus, an additional window or other protective cover for the housing opening is unnecessary, the elimination of which advantageously reduces the light signal losses associated therewith, and reduces manufacturing and assembly costs.

According to yet another aspect of the invention, there is provided a method for producing a data collection device scan engine. The method includes providing a housing with an opening for receiving light from a scanned dataform, mounting an image sensor within the housing, the image sensor having an aperture and being operative to sense light entering the aperture, and mounting a prism within the housing for receiving light from the opening along a first path and providing at least a portion of the received light to the aperture along a second path. The prism may comprise a first planar face generally perpendicular to the first path and a second planar face generally perpendicular to the second path, wherein the method may further include mounting the second face on the aperture. This may be accomplished, for example, using a low loss transparent adhesive. In this way, no gap exists between the second face of the prism and the image sensor aperture, thus further reducing incoming light signal loss.

In addition, where the opening is located in a first wall of the housing, the method may include locating the first face of the prism so as to cover the opening. Moreover, where a seal is desirable between the interior and exterior of the scan engine housing, the method may further include providing a seal around the opening of the first enclosure wall using the first face of the prism. The method thus eliminates additional housing windows associated with conventional scan engines, and the losses associated therewith.

According to still another aspect of the invention, there is provided a data collection device scan engine image sensor assembly. The assembly includes an image sensor having an aperture and being operative to sense light entering the aperture, and a prism mounted on the aperture and adapted to receive light along a first path and to provide at least a portion of the received light to the aperture along a second path. The prism may comprise a first planar face generally perpendicular to the first path and a second planar face generally perpendicular to the second path, wherein the first planar face may be further adapted to cover an opening in a scan engine housing. In addition, the first face of the prism may be further adapted to provide a seal around the opening of the scan engine housing.

To the accomplishment of the foregoing and related ends, certain illustrative aspects and implementations of the present invention are hereinafter described with reference to the attached drawing figures. The following description and the annexed drawings set forth in detail certain illustrative applications and aspects of the invention. These are indicative, however, of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

The present invention will now be described with reference to the drawings, wherein like reference numerals are used to refer to like elements throughout. The following description and the attached drawings are provided in order to illustrate the various aspects of the present invention, and should not be interpreted as a limitation thereof. The invention provides a data collection device scan engine including an image sensor and a prism adapted to direct light from a bar code or other dataform onto an image sensor, which provides low signal loss and allows the image sensor to be located at an angle to the path of the light from the dataform. Although the invention finds particular utility in association with reduced size data collection devices, such as a micro reader, it will be appreciated that the invention may be employed in other applications as well.

Figure 1:
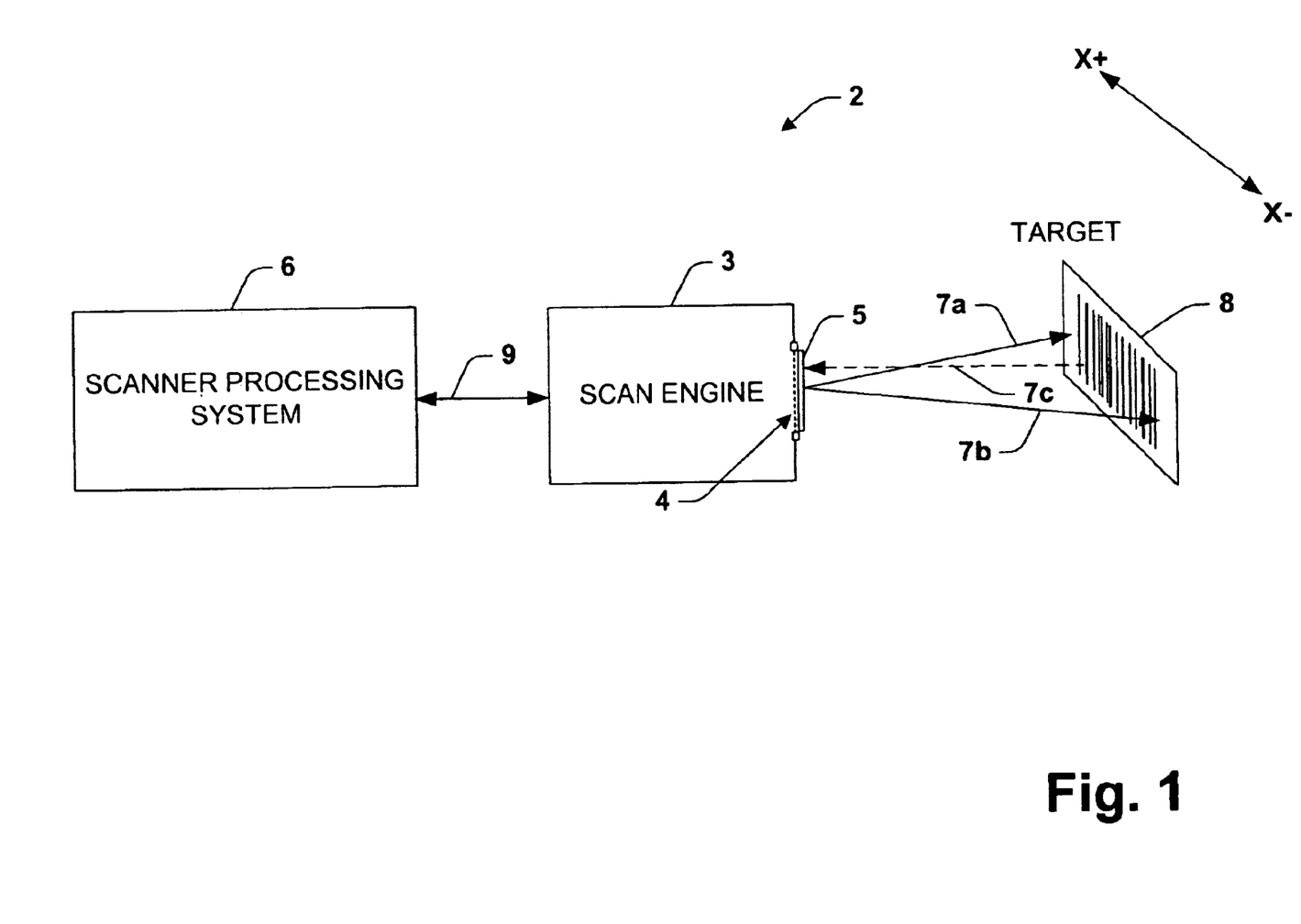
FIG. 1 is a schematic diagram illustrating an exemplary data collection device in which various aspects of the present invention may be employed.

Referring initially to FIG. 1, an exemplary data collection system 2 is schematically illustrated including a scan engine component 3 operatively coupled to a scanner processing system 6 via a system bus 9. The scan engine 3 projects a light ray 7a through an aperture window 4 and a focusing system 5 on to an exemplary bar code or dataform target 8. The bar code target 8 (e.g., a sequence of vertical black and white bars) is scanned from an X+direction (depicted as light ray 7a) to an X- direction (depicted as light ray 7b). It is to be appreciated that scanning may also take place in the opposite direction.

A plurality of light rays 7c (one ray is shown for simplicity) reflect from the target 8 back through the focusing system 5 on the scan engine 3. The focusing system 5 may be a single optical lens system for directing and receiving light or may include a separate directing and receiving lens for sending and receiving light to and from the target 8. Although conventional focusing systems variously include lenses and/or mirrors, the present invention advantageously provides a prism, as illustrated and described in greater detail hereinafter, which overcomes shortcomings associated with previous focusing system components.

The scan engine 3, receives a light ray 7c and converts the ray to an electrical signal. The electrical signal is digitized and sent over the system bus 9 to the scanner processing system 6 for analysis and storage. It is to be appreciated that signal processing and analysis may take place at the scan engine 3, or the scanner processing system 6, or such processing tasks may be shared between the two system components 3 and 6. For example, the scanner processing system 6 may provide a plurality of application software systems to process the bar code dataform information. Such application software systems may include, for example, accounting controls, inventory controls, pricing information, location information, and other information and/or functions suitably relevant to the dataforms and/or the items being scanned.

Figure 2:
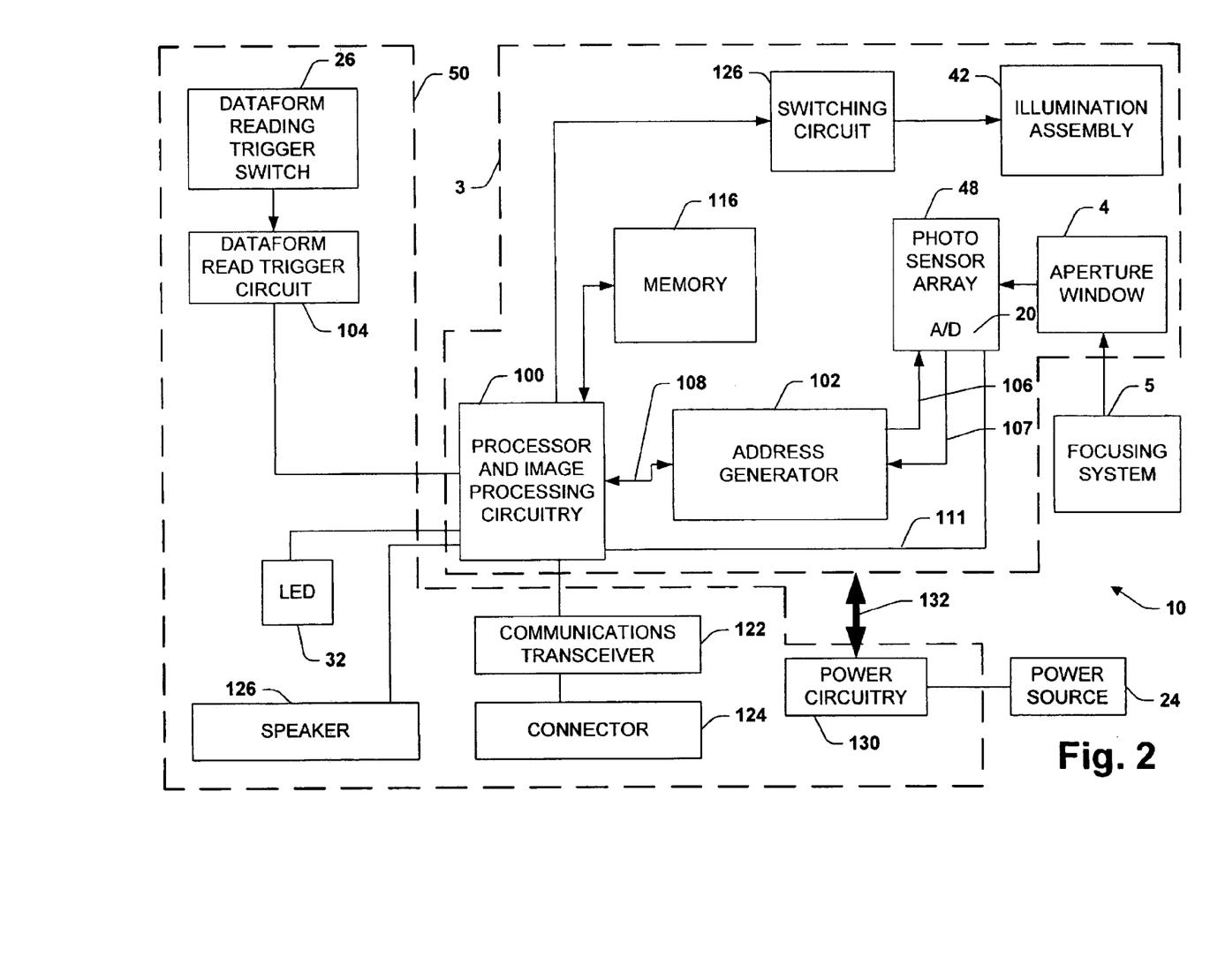
FIG. 2 is a schematic diagram illustrating another exemplary data collection device having a scan engine component in accordance with the invention.

Turning now to FIG. 2, a block diagram of an exemplary data collection device 10 is provided, including a scan engine component 3 and a host interface component 50. In the scan engine component 3, a microprocessor 100 controls the various operations and performs image analysis in decoding a target dataform, For example, the microprocessor 100 may be programmed to carry out the various control and processing functions utilizing conventional programming techniques. A memory 116 coupled to the microprocessor 100 serves to store the various programs and other data associated with the operation of the data collection device 10 as described herein. A person having ordinary skill in the art will be able to program such operations without undue effort. Hence, additional detail is omitted for sake of brevity.

The microprocessor 100 is coupled to an address generator 102, via a local bus 108, which is designed to output a sequence of pixel addresses corresponding to a desired pixel data readout pattern from an image sensor or photosensor array 48. For example, the microprocessor 100 may be configured to read out consecutive horizontal lines of pixel data from multiple zones so that such pixel data can be processed to reconstruct the entire dataform provided within the field of view of the data collection device 10.

The addresses are provided from the address generator 102 to the photosensor array 48 via an address bus 106. The photosensor array 48 provides, as its output data, pixel data on data bus 107 which corresponds to the address provided on the data bus 106. The address generator 102 in turn provides the pixel data to the microprocessor 100 via bus 108. Data may therefore be collected from the photosensor array 48 substantially in real time according to a predefined data readout pattern. It will be appreciated that while the present embodiment depicts the address generator 102 as being physically separated from the photosensor array 48, it is possible for both components to be provided on a single image sensor chip.

The device 10 further includes a host interface board 50 including a trigger switch 26 and associated data form read trigger circuitry 104. In order to carry out a dataform reading operation, the operator points a focusing system 5 towards a target dataform (e.g., dataform 8 of FIG. 1). Light from the scanned dataform is directed by the focusing system 5 to an aperture window 4 which presents the light to the photosensor array 48. The operator then initiates the dataform read operation via the trigger switch 26 or other methods. The dataform read trigger circuit 104 generates an interrupt signal which is provided to the microprocessor 100 indicating the initiation of a dataform reading operation. The microprocessor 100 communicates with the address generator 102 via the control bus 205 which causes the address generator 102 to begin generating addresses for the predefined readout pixel pattern.

The image data from the photosensor array 48 consists of digital data indicative of the instantaneous illumination of the pixel. For example, in the exemplary device 2 illustrated in FIG. 1, it is assumed that the target dataform 8 is made up of a series of black bars and white spaces. The photosensor array 48 of device 10 includes an analog to digital (A/D) converter 20 for converting analog pixel data obtained from the addressed pixels to digital pixel data. The A/D converter 20 has adjustable gain which may be adjusted via a gain adjust control signal provided on line 111 from the microprocessor 100. The digitized pixel data from the photosensor array 48 is provided via the address generator 102 to the microprocessor 100. The microprocessor 100 evaluates the range of the acquired pixel data on-the-fly to see if the full range of the A/D converter 20 is utilized. If not, the microprocessor 100 adjusts the gain of the input to the AID converter 20. The microprocessor 100 then proceeds to decode the image of the target dataform.

Additionally, the microprocessor 100 is coupled to the illumination assembly 42 via switching circuitry 126 which enables the microprocessor 100 to control the illumination assembly 42 to provide general illumination of a scanned target dataform and targeting during operation. The illumination assembly 42 of the present embodiment may employ any of various light sources having output light which is sculpted to be spread across such a dataform. Moreover, the microprocessor 100 may be coupled to an LED 32 to adjust its color state and/or to an audible annunciator or speaker 126 in order to indicate the current mode of operation.

The host interface board component 50 of the data collection device 10 may further include a communications transceiver 122 (e.g., RS-232, RS-485) and an associated connector 124 for transmitting and receiving data to and from remote devices, such as computers, modems, transmitters, etc, along with the LED 32 and a speaker 126.

In addition, the interface 50 may include power circuitry 130 and electrical connections 132 for providing electrical power from a power source 24 to the various components of the interface 50 as well as the scan engine component 3. The power source 24 may include, for example, rechargeable batteries, and the like.

Figure 3:
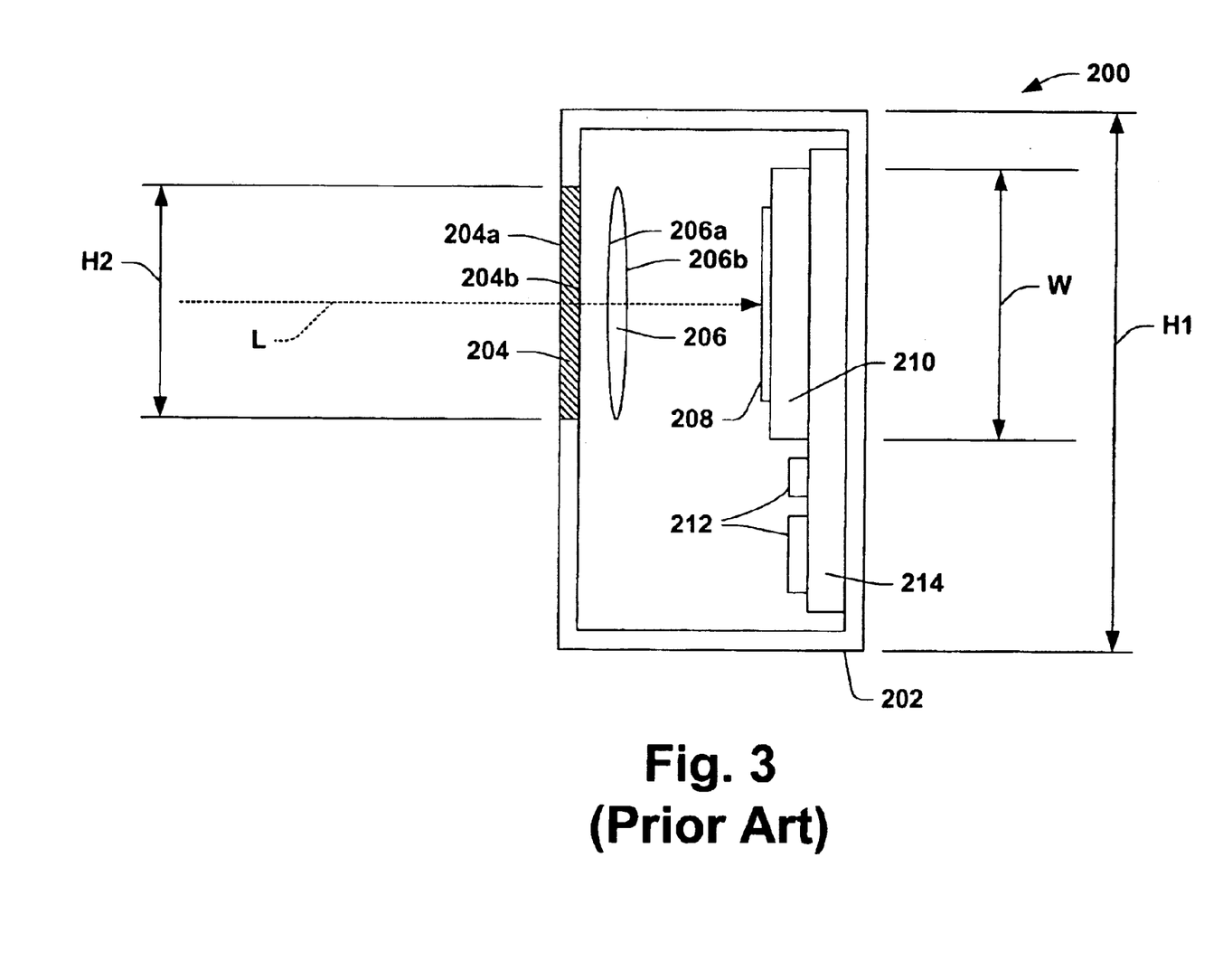
FIG. 3 is a side elevation view in section illustrating a conventional scan engine with a sensor array and a lens.

Referring now to FIG. 3, a conventional scan engine 200 is illustrated having an enclosure or housing 202 with a cover 204 in an opening therein, and a focusing lens 206. Incoming light L reflected from the surface of a scanned dataform (not shown) passes through first and second surfaces 204a and 204b of the cover 204, as well as first and second surfaces 206a and 206b of the lens 206, and onto an aperture window 208 of an image sensor component 210. The image sensor component 210 may be an integrated circuit mounted along with other components 212 on a printed circuit board (PCB) 214 mounted in the enclosure 202.

It will be appreciated by those skilled in the art that the strength of the light signal L is reduced through signal losses associated with the materials used in making the cover 204 and the lens 206, and further that there is a non-zero signal loss associated with each of the surfaces 204a, 204b, 206a, and 206b associated therewith. In order to reduce these losses, the present invention provides a prism which may be employed to replace both the window 204 and the lens 206, as illustrated and described in greater detail hereinafter. Thus, the invention reduces the signal losses found in conventional scan engines such as scan engine 200. In addition, it will be recognized that the image sensor device 210 has a certain physical width W determined by the standard integrated circuit package sizes known in the art. As the size of scan engine components continues to decrease, it is desirable to decrease the overall height HI of such devices, and also to decrease the height H2 of the enclosure opening for window 204. However, the width W of the image sensor component 210 may be fixed for available standard components.

Figure 4:
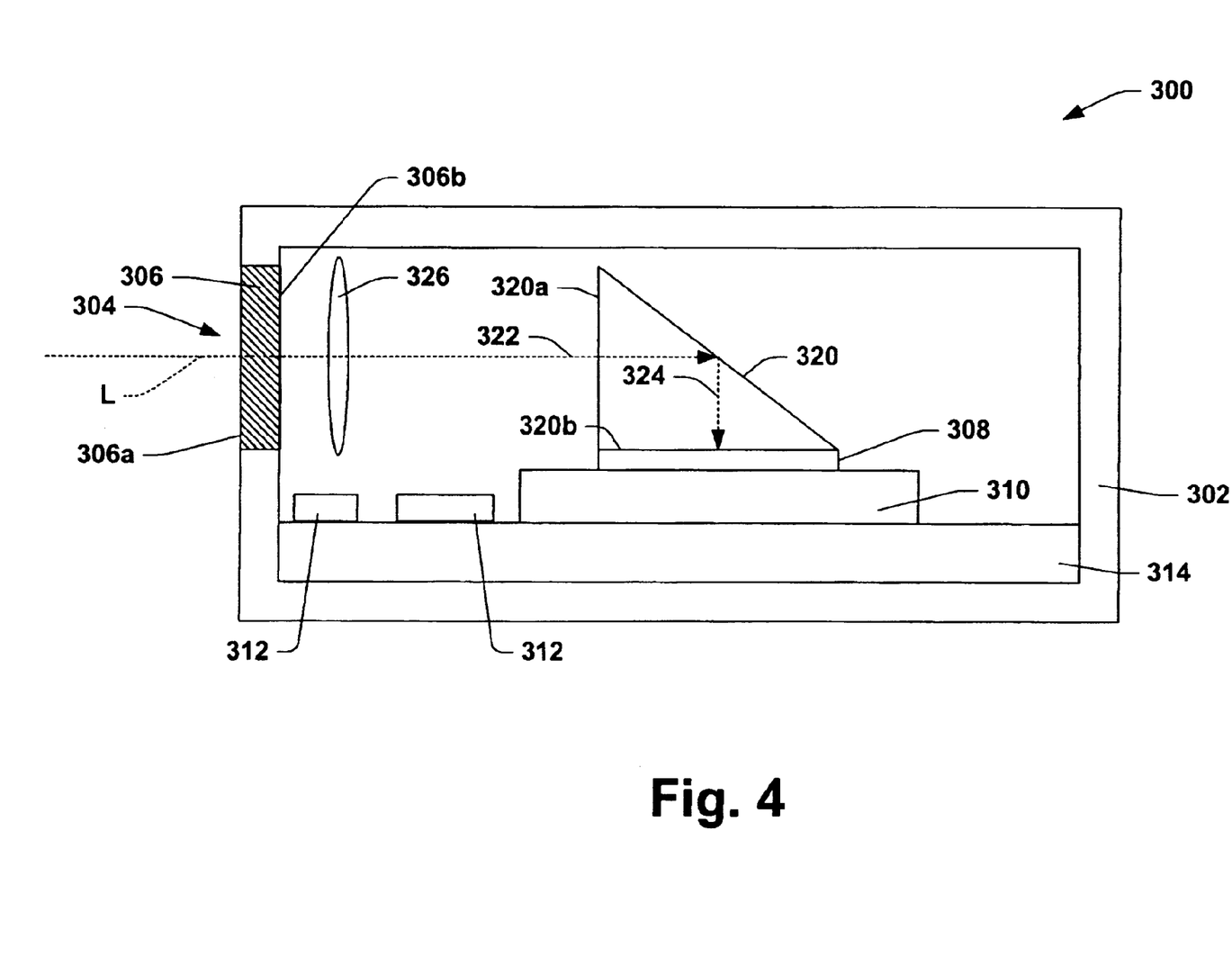
FIG. 4 is a side elevation view in section illustrating an exemplary scan engine with a prism in accordance with an aspect of the invention.

Referring now to FIG. 4, an exemplary scan engine 300 is illustrated in accordance with an aspect of the invention, including a low profile enclosure or housing 302 having a reduced height opening 304 with a window or protective cover 306 therein. The cover 306 may provide a seal between the interior and exterior of the scan engine housing 302. The scan engine 300 further includes an image sensor component 310 with an aperture 308 thereon, wherein the sensor component 310 is mounted along with other components 312 on a PCB 314. The image sensor 310 is operative to sense light entering the aperture 308 for processing as is known in association with bar code and other dataform readers. In accordance with an aspect of the invention, the scan engine 300 also includes a prism 320 located within the housing 302 and adapted to receive light L through the opening 304 along a first path 322 via an imaging lens 326 to provide at least a portion of the received light L to the aperture 308 along a second path 324.

The Prism 320 advantageously provides for mounting of a standard sensor 310 within the low profile housing 302 such that the first and second paths 322 and 324, respectively, are generally perpendicular, although other angular arrangements are contemplated as within the scope of the invention. This allows use of standard sensors 310 which are too wide to be mounted in a plane parallel to the window 306, particularly in low profile micro readers and the like. The prism 320 comprises a first planar face 320a generally perpendicular to the first path 322 and a second planar face 320b generally perpendicular to the second path 324.

The second face 320b may further be mounted directly onto the image sensor aperture 308, for example, using a low loss transparent adhesive (not shown). It will be noted in this regard, that while a gap (not shown) may be provided between the second face 320b of the prism 320 and the sensor aperture 308, light signal losses associated with such a gap may be advantageously reduced according to an aspect of the invention through mounting the second face 320b of the prism 320 directly onto the aperture 308. Furthermore, it will be appreciated that mounting the prism 320 directly onto the aperture 308 of the image sensor component 310 further reduces the size of the image sensor assembly. Moreover, the use of a prism 320 mounted to the aperture 308 provides for repeatable angular reflection of light from path 322 to path 324. In conventional scan engines employing mirrors, the placement of such mirrors required careful manufacturing and assembly steps to ensure the desired angular reflection. In addition, the light signal losses associated with mirrors is greater than that of prisms. Thus, the present invention provides for a cost effective improvement over such conventional devices and manufacturing methodologies.

In accordance with another aspect of the invention, the first face 320a of the prism 320 may be further located proximate the opening 304 in the housing 302, thereby reducing or eliminating the signal losses associated with a gap (not numerically designated) therebetween. In addition, the invention further allows the elimination of the cover 306 and the light losses associated with the front and rear surfaces 306a and 306b, respectively, thereof.

Figure 5A:
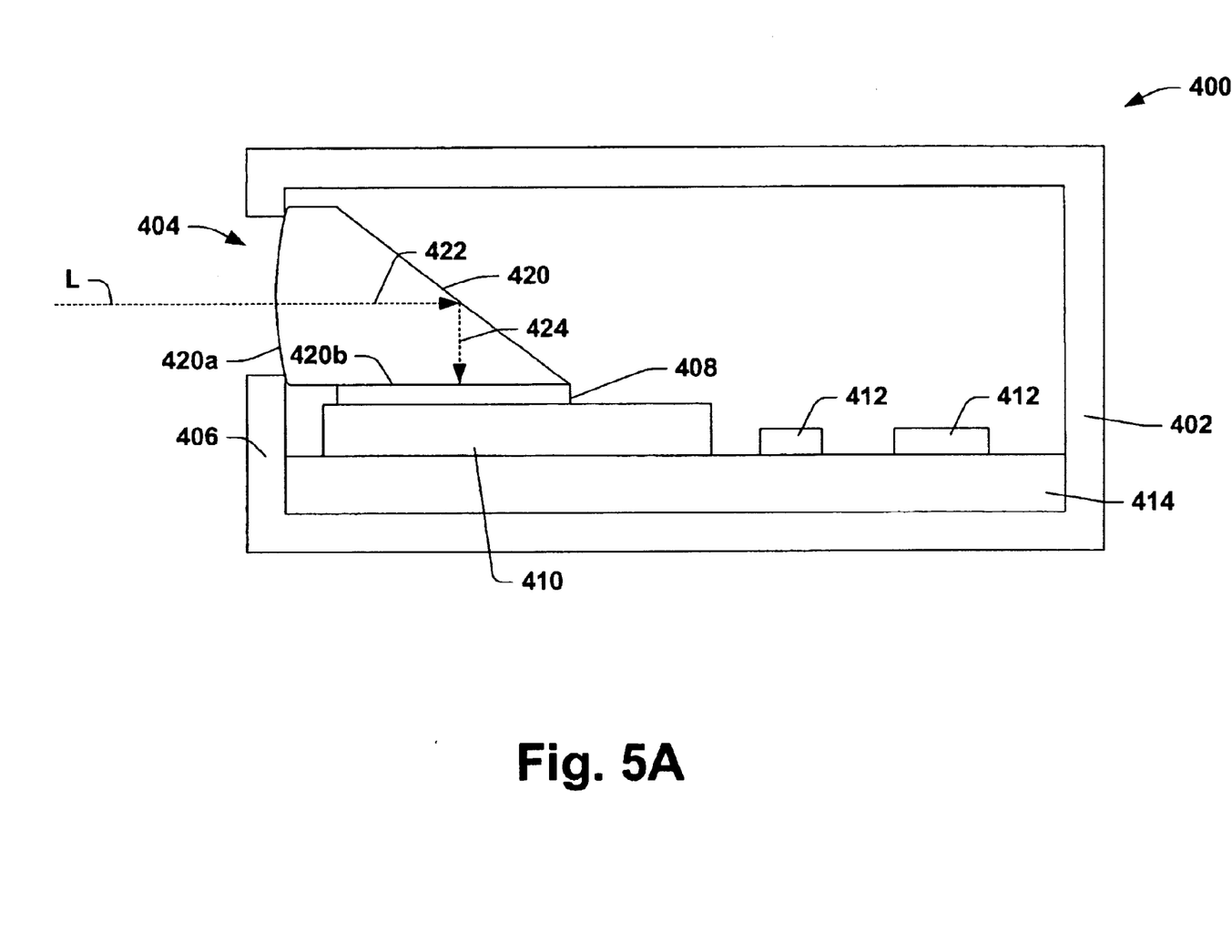
FIG. 5A is a side elevation view in section illustrating another exemplary scan engine with prism in accordance with an aspect of the invention.

Referring also to FIG. 5A, other exemplary scan engine 400 is illustrated in accordance with the invention. The scan engine 400 includes a housing 402 having an opening 404 in a first wall 406 thereof, and through which light L is introduced to a first face 420a of a prism 420 along a path 422. Scan engine 400 further includes an image sensor component 410 with an aperture 408 thereon, wherein the sensor component 410 is mounted along with other components 412 on a PCB 414. As shown, the first face 420a of prism 420 is mounted within the housing 402 so as to provide a seal between the exterior and interior of the scan engine 400, whereby the need for an additional window (e.g. window 204 of FIG. 3) is eliminated.

The image sensor 410 is adapted to sense light L entering the aperture 408 along a second path 424. In accordance with an aspect of the invention, the scan engine 400 also includes the prism 420 located within the housing 402 and adapted to receive light L from the opening 404 along the first path 422 and to provide at least a portion of the received light L to the aperture 408 along a second path 424. Although there may be non-zero surface losses associated with the first and second faces 420a and 420b, respectively, of the prism 420, it will be appreciated that the invention provides for the reduction in total light signal loss through the elimination of the window (e.g., window 204 of FIG. 3), and the mirrors, lenses, and/or air gaps along the light paths of prior conventional scan engines.

The prism 420 furthermore advantageously provides for mounting of a standard sensor component 410 (e.g., having a standard integrated circuit footprint size) within the low profile housing 402 such that the first and second paths 422 and 424, respectively, are generally perpendicular, although other angular arrangements are contemplated as within the scope of the present invention. Standard sensors 410 may thus be employed which are too wide to be mounted in a plane parallel to the window 406, particularly in low profile micro readers and the like. The prism 420 comprises a first face 420a generally perpendicular to the first path 422 and a second planar face 420b generally perpendicular to the second path 424.

In addition, the first face 420a may include a spherical convex shape, whereby the prism 420 may also serve as an imaging lens. Thus, the prism 420 advantageously allows cost and/or size reduction through the elimination of a separate lens (e.g., lens 326 of FIG. 4). According to another aspect of the invention, the second face 420b of the prism 420 may be further adapted to cover the opening 404 in the housing wall 406. In addition, the prism face 420a may be adapted to provide a seal around the opening 404 of the enclosure wall 406, thus eliminating the need for a window or other protective cover therein.

The second face 420b of prism 420 may further be mounted directly onto the image sensor aperture 408, for example, using a low loss transparent adhesive (not shown). It will be noted in this regard, that while a gap (not shown) may be provided between the second face 420b of the prism 420 and the sensor aperture 408, light signal losses associated with such a gap may be advantageously reduced according to an aspect of the invention through mounting the second face 420b of the prism 420 directly onto the aperture 408.

In addition, mounting the prism 420 directly onto the aperture 408 of the image sensor component 410 further reduces the size of the image sensor assembly. Furthermore, it will be appreciated that the invention comprises an image sensor assembly, including the image sensor 410 having an aperture 408, and a prism 420 mounted on the aperture 408 and adapted to receive light L along the first path 422 and to provide at least a portion of the received light L to the aperture 408 along the second path 424.

Figure 5B:
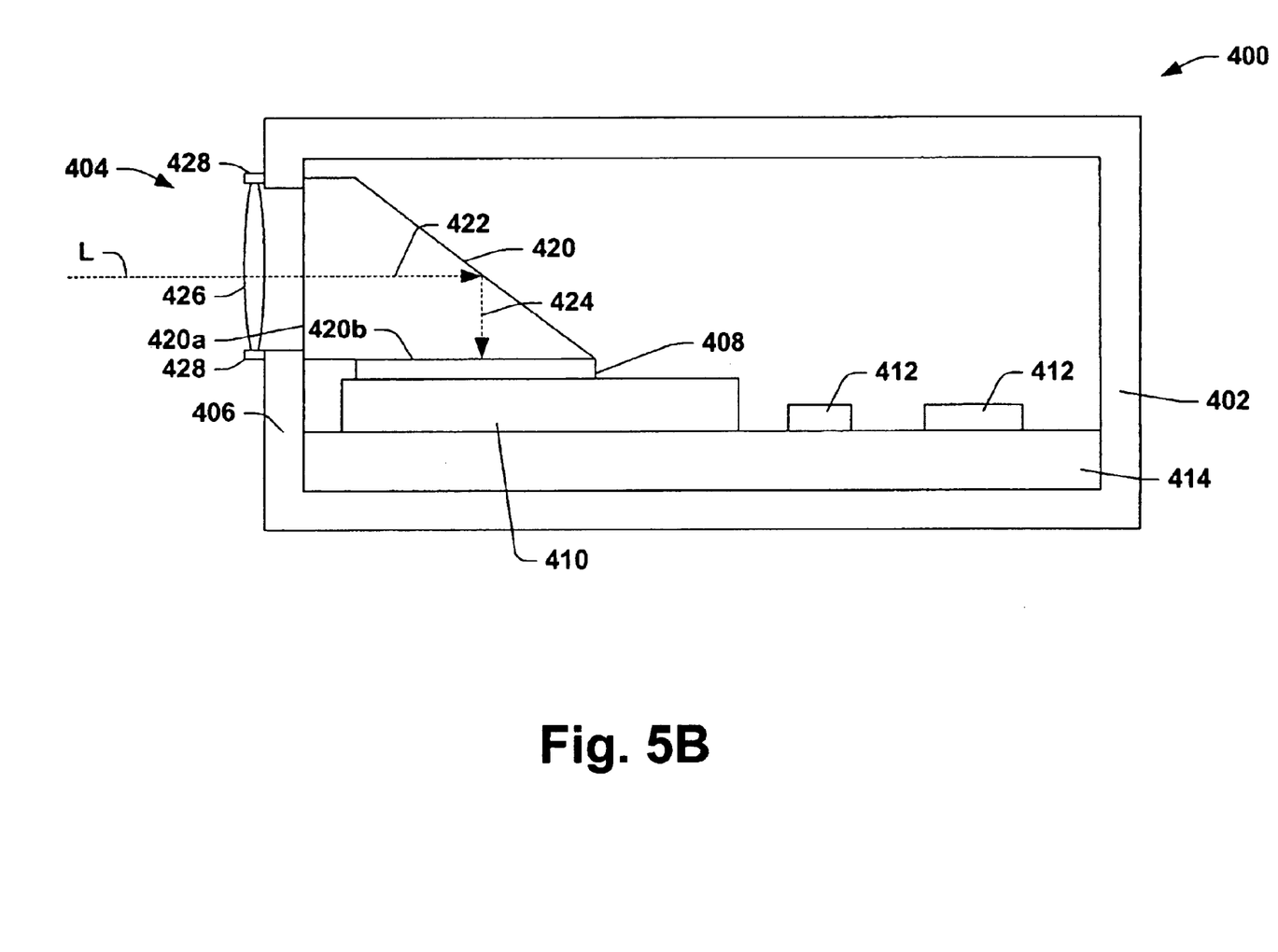
FIG. 5B is a side elevation view in section illustrating another exemplary scan engine with a prism and a removable lens in accordance with another aspect of the invention.

Referring now to FIG. 5B, the first face 426a of the prism 420 may be planar, and the scan engine 400 may further comprise a lens 426 adapted for detachable mounting on first wall 406 for imaging of the light L prior to passage thereof through the opening 404. Lens 426 may be mounted onto wall 406 using engagement members 428 adapted for retractable engagement with one or more portions of the lens 426. In this manner, a user may selectively change the lens 426 allowing for multi-configuration usage of the scan engine 400 depending on desired focal length or other application considerations.

Figure 6:
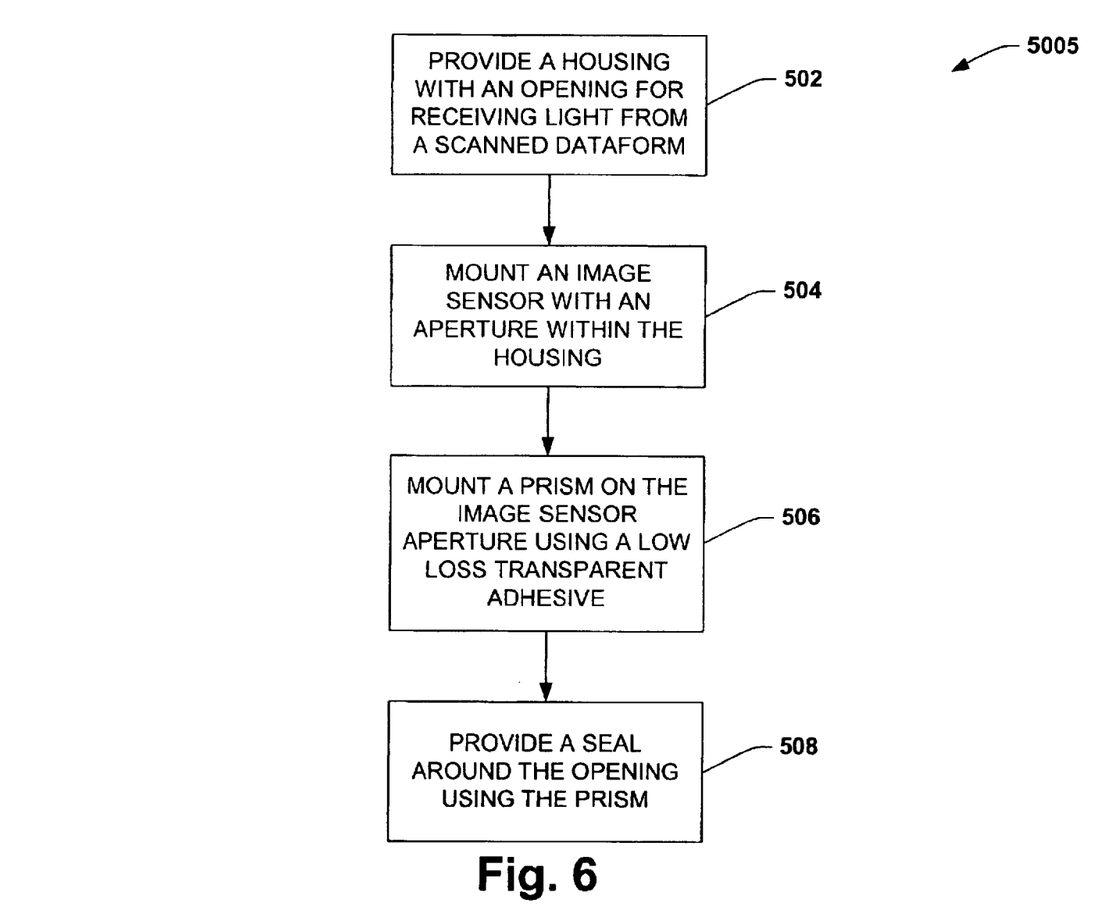
FIG. 6 is a flow diagram illustrating an exemplary method of producing a scan engine in accordance with another aspect of the invention.

Referring now to FIG. 6, an exemplary method 500 of producing a scan engine (e.g., scan engines 300 and/or 400 of FIGS. 4 and 5, respectively) is illustrated in accordance with another aspect of the invention. The exemplary method 500 begins at step 502, whereat a housing is provided (e.g., housing 302 of FIG. 4) with an opening for receiving light from a scanned dataform (e.g., barcode dataform 8 of FIG. 1). At step 504, an image sensor (e.g., sensor 310) is mounted within the housing. A prism (e.g., prism 320) is mounted at step 506 on an aperture (e.g., aperture 308) of the image sensor. The prism may be mounted on the aperture using, for example, a low loss transparent adhesive. At step 508, a seal may be provided around the opening in the housing using the prism.

Although the invention has been shown and described with respect to a certain aspects and implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i e., that is functionally equivalent), even though not structurally equivalent to the disclosed structure, which performs the function in the herein illustrated exemplary aspects of the invention. In addition, while a particular feature of the invention may have been disclosed with respect to only one of several implementations, such feature may be combined with one or more other features of the other aspects as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A data collection device scan engine image sensor assembly, comprising:

an image sensor that senses a bar code and generates a pixel data pattern, the image sensor includes aperture and senses light entering the aperture;

a prism mounted on the aperture to receive light along a first path and to provide at least a portion of the received light to the aperture along a second path; and a lens mounted along the first path between the bar code and the prism to facilitate directing the light from the bar code to the prism, such that the light enters a fist surface of the lens without impacting an intermediate lens, and exits the lens directly to the prism.

2. The assembly of claim 1, wherein the prism comprises a first planar face adapted to receive light along the first path, and a second planar face adhered to the aperture using a low loss transparent adhesive.

3. A scan engine for use in a data collection device, comprising:

a housing having an opening for receiving light from a scanned dataform;

an image sensor located in the housing and having an aperture, which image sensor sense the dataform through the aperture by converting the dataform into a pixel-by-pixel representation;

a prism mounted onto the aperture of the image sensor to receive light from the opening along a first path and to provide at least a portion of the received light to the aperture along a second path; and a lens mounted within the housing along the first path between the opening and the prism to facilitate directing the light from the opening to the prism, such that the light enters a first surface of the lens without impacting an intermediate lens, and exits the lens directly to the prism.

4. The scan engine of claim 3, wherein the second path is at an angle with respect to the first path.

5. The scan engine of claim 3, wherein the second path is perpendicular to the first path.

6. The scan engine of claim 3, wherein the prism comprises a first planar face generally perpendicular to the first path and a second planar face generally perpendicular to the second path, and wherein the second face is mounted on the aperture of the image sensor.

7. The scan engine of claim 3, wherein the first face of the prism is located proximate the opening in the housing.

8. The scan engine of claim 3, further comprising a printed circuit board mounted in the housing.

9. The scan engine of claim 8, wherein the image sensor is mounted on the printed circuit board.

10. The scan engine of claim 3, further comprising a window coupled to the opening of the housing, such that the window provides a seal between an interior and an exterior of the housing.

11. The scan engine of claim 3, being employed in a bar code reader.

12. A method for producing a data collection device scan engine, comprising:

providing a housing with an opening for receiving light from a scanned dataform;

mounting an image sensor within the housing, the image sensor having an aperture and senses light entering the aperture, the image sensor converts scanned dataform into a pixel data pattern;

mounting a prism onto the aperture of the image sensor that receive light from the opening along a first path and provides at least a portion of the received light to the aperture along a second path; and providing a lens in the first path between the opening and the prism to facilitate directing the light from the opening to the prism, such that the light enters a first surface of the lens without impacting an intermediate lens, and exits the lens directly to the prism.

13. The method of claim 12, wherein the prism comprises a first planar face generally perpendicular to the first path and a second planar face generally perpendicular to the second path, the second planar face being mounted on the aperture.

14. The method of claim 13, wherein mounting the second face on the aperture includes adhering at least a portion of the second face of the aperture using a transparent low loss adhesive.

15. The method of claim 12, further comprising mounting a printed circuit board to the housing of the scan engine.

16. The method of claim 12, wherein mounting the image sensor within the housing includes mounting the image sensor to a printed circuit board located in the housing.

17. A data collection device scan engine image sensor assembly, comprising:

an image sensor having an aperture and that senses light entering the aperture of a dataform, the image sensor converts the light into a pixel-by-pixel representation for transmission therefrom; and a prism mounted on the aperture of the image sensor, the prism receives light along a first path and provides at least a portion of the received light to the aperture along a second path; and a lens positioned along the first path to facilitate directing the light from the opening to the prism, such that the light enters a first surface of the lens without impacting an intermediate lens, and exits the lens directly to the prism.

18. The assembly of claim 17, wherein the prism comprises a first planar face adapted to receive light along the first path, and a second planar face adhered to the aperture of the image sensor using a low loss transparent adhesive.

19. A product code scan engine, comprising:

a housing having an opening for receiving light from a scanned dataform;

an image sensor located within the housing and having an aperture, the image sensor senses light from the dataform through the aperture by converting the dataform into a pixel-by-pixel representation;

a prism mounted onto the aperture of the image sensor to receive light through the opening along a first path and to provide at least a portion of the received light to the aperture along a second path; and a lens mounted within the housing between the opening and the prism along the first path to facilitate directing the light from the opening to the prism.

20. A bar code leading engine, comprising;

a housing with an opening for receiving light from a scanned bar code;

means for mounting an image sensor within the housing, the image sensor having an aperture and that senses light entering the aperture, the image sensor converts the scanned dataform into a pixel data pattern representative of the bar code;

means for mounting a prism on the aperture of the image sensor, which prism receives light from the opening along a first path and redirects at least a portion of the received light to the aperture along a second path, and means for providing a lens in the first path between the opening and the prism to facilitate directing the light from the opening to the prism, such that the light enters a first surface of the lens without impacting an intermediate lens, and exits the lens to the prism without being altered therebetween.

21. The engine of claim 20, further comprising means for mounting a printed circuit board mounted in the housing.

22. The engine of claim 21, Further comprising means for mounting the image sensor on the printed circuit board.

23. The engine of claim 20, further comprising means for coupling a window to the opening of the housing, such that the window provides a seal between an interior and an exterior of the housing.

* * * * *